United States Patent [19]

Arndt et al.

[11] 4,452,551

[45] Jun. 5, 1984

[54] PROCESS FOR STABILIZING ROCK AND COAL FORMATIONS BY BONDING THESE FORMATIONS TO THEMSELVES OR OTHER GEOLOGICAL FORMATIONS

[75] Inventors: Diether Arndt, Freinsheim; Dietmar Hobein, Neu-Esting, both of Fed. Rep. of Germany

[73] Assignee: BASF Aktiengesellschaft, Ludwigshafen, Fed. Rep. of Germany

[21] Appl. No.: 383,092

[22] Filed: May 28, 1982

[30] Foreign Application Priority Data

Jun. 6, 1981 [DE] Fed. Rep. of Germany ....... 3122693

[51] Int. Cl.$^3$ .............................................. E02D 3/12
[52] U.S. Cl. .................................. 405/264; 166/295; 405/266
[58] Field of Search ................ 166/294, 295; 405/264, 405/266

[56] References Cited

U.S. PATENT DOCUMENTS

| | | | |
|---|---|---|---|
| 3,181,612 | 5/1965 | West et al. ...................... | 166/295 X |
| 3,623,330 | 11/1971 | Nakade et al. ...................... | 405/264 |
| 3,637,019 | 1/1972 | Lee ...................... | 166/295 |
| 3,736,738 | 6/1973 | Dolfing et al. ...................... | 405/264 |
| 3,878,686 | 4/1975 | Hageman et al. ............... | 166/295 X |
| 3,882,684 | 5/1975 | Meyer et al. ...................... | 405/264 |
| 4,008,576 | 2/1977 | Meyer et al. ...................... | 405/264 |
| 4,114,382 | 9/1978 | Kubens et al. ...................... | 405/264 |
| 4,264,486 | 4/1981 | McLaughlin .................... | 166/295 X |
| 4,307,980 | 12/1981 | Meyer et al. .................... | 166/295 X |

FOREIGN PATENT DOCUMENTS

| | | | |
|---|---|---|---|
| 6034204 | 9/1976 | Japan ................................. | 405/264 |
| 6128830 | 10/1981 | Japan ................................. | 405/264 |

*Primary Examiner*—George A. Suchfield
*Attorney, Agent, or Firm*—David L. Hedden; Joseph D. Michaels

[57] ABSTRACT

The invention relates to a process for stabilizing rock and coal formations by bonding them to each other or to other geological formations. The bonding material is a reactive organic polyisocyanate-polyol mixture which may contain a catalyst.

7 Claims, No Drawings

PROCESS FOR STABILIZING ROCK AND COAL FORMATIONS BY BONDING THESE FORMATIONS TO THEMSELVES OR OTHER GEOLOGICAL FORMATIONS

BACKGROUND OF THE INVENTION

1. Field of the Invention

The subject invention relates to the use of polyisocyanate-polyol mixtures to stabilize rock and coal formations.

2. Description of the Prior Art

Processes for stabilizing geologic formations or sealing formations against water or gas with the aid of polyurethanes are known in the art.

For instance, German Pat. No. 1,129,894 (British Pat. No. 885,762) describes how mixtures of polyisocyanates and a polyol containing at least three reactive hydroxy groups in a liquid carrier are pressed into the formation which is to be sealed or stabilized. Suitable polyols include polyalcohols, such as hexane triol, polyester polyols of dicarboxylic acids and bi- and trifunctional alcohols, and preferably, castor oil.

The process has drawbacks because of the low elasticity or pressure and bending strength of the polyurethane used for the stabilization of the geologic formations. Consequently, shifts in the stabilized formations can occur as a result of the pressure of the formations and the effects of external forces such as are incurred during the mechanical mining of coal. Another drawback is the nonmiscibility of castor oil with water. Consequently, the castor oil must be separated from the system by absorbing water. Moreover, the relatively high viscosity of the castor oil (approximately 1000 mPas at 25° C.) causes an increase of the viscosity of the system so that a flawless penetration into the smallest cracks of the geological formation can no longer be guaranteed. Another drawback of the process is the low bonding between the polyurethane and coal or stone when the system contains significant quantities of castor oil.

In order to avoid these drawbacks, German Published Application No. 1,745,366 (British Pat. No. 1,104,839 describes polyol mixtures of a tree resin with a softening point of at least 70° C. or one of it derivatives and a low molecular polyol with a hydroxyl number of at least 1000 such as trimethylolpropane, glycerine, hexanetriol, sorbitol, cane sugar and others. The polyurethane foams produced in this manner have excellent tenacity. By using the above-mentioned tree resins, however, systems are obtained which have a relatively high viscosity.

German Pat. No. 2,436,029 (U.S. Pat. No. 4,114,382) describes the use of a polyisocyanate-polyol mixture for stabilizing geological formations wherein the polyol component contains 5 to 50 percent by weight of a polyether polyol of alkylene oxide with a hydroxyl number below 100. As illustrated in the application, this results in highly flexible polyurethanes with a high elasticity modulus and high bending strength as well as high bonding to coal and surrounding rock formations. However, according to German Published Application No. 1,745,366, very brittle polyurethane foams are obtained from the same polyol mixtures.

As can be seen, there is a need for polyurethane systems for stabilizing rock and coal formations by bonding these formations to themselves or other geological formations. These systems must have a relatively low viscosity so they can penetrate into gaps and smallest cracks, and must have high adhesion. In this manner, they guarantee sufficient coating of the surface.

SUMMARY OF THE INVENTION

The subject invention relates to an improvement in the process for stabilizing rock and coal formations by bonding these formations to themselves or other geological formations by means of reactive organic polyisocyanatepolyol mixtures characterized in that polyols used in the mixtures comprise (a) from 1 part to 60 parts by weight of at least one tri- to octafunctional polyether polyol with a hydroxyl number of 390 to 570;

(b) from 40 parts to 99 parts by weight of at least one difunctional polyether polyol with a hydroxyl number of 200 to 300; and (c) from 0 part to 100 parts by weight per 100 parts by weight of components (a) and (b) of a flexibilizer with a hydroxyl number of 50 to 200.

By using difunctional polyether polyols with hydroxyl numbers of 200 to 300 in the above-mentioned quantities, the viscosity of the systems can be reduced and the compatibility with the optionallly used flexibilizers can simultaneously be improved.

DESCRIPTION OF THE PREFERRED EMBODIMENTS

Suitable polyether polyols with the mentioned functionalities and hydroxyl numbers for components (a), (b), and (c) are produced in accordance with known methods by reacting one or more oxides with 2 to 4 carbon atoms in the alkylene radical with an initiator molecule which contains 2 to 8 reactive hydrogen atoms in bonded form. Suitable alkylene oxides include, for instance, 1,2- and 2,3-butylene oxide, propylene oxide, and ethylene oxide. Epoxides such as styrene oxide and 1,3-propane oxide may also be used. Preferably used are ethylene oxide, mixtures of ethylene and propylene oxide and, particularly, propylene oxide. The alkylene oxides may be used individually, alternatingly in sequence or as mixtures.

Preferably used initiator molecules for the preparation of the tri- to octafunctional, preferably tri- to hexafunctional, polyether polyols with hydroxyl numbers of 390 to 570, preferably of 450 to 550, which are used as component (a), include multifunctional alcohols, particularly those with 3 to 8 hydroxyl groups or their mixtures. Examples include glycerine, trimethylolethane, trimethylolpropane, pentaerythritol, sorbitol and sucrose. Other suitable initiator molecules include trialkanolamines, such as triethanolamine and triisopropylamine; aliphatic, cycloaliphatic and aromatic diamines with 2 to 15 carbon atoms such as ethylene diamine, 1,3-propane diamine, propylene diamine, 1,4-butane diamine, 1,6-hexamethylene diamine, 1,4-diaminocyclohexane, 4,4'-, 2,4'- and 2,2'-diaminodiphenylmethane, and ammonium hydrazine. The tri- to octafunctional polyether polyols may be used individually or as mixtures.

Suitable difunctional polyether polyols with hydroxyl numbers of 200 to 300, preferably 230 to 280, which are used as component (b), are obtained by oxyalkylation, preferably oxypropylation, of water and/or bifunctional alcohols such as ethylene-, propylene-, diethylene-, dipropylene-, 1,3-propane-, 1,4-butane- and 1,6-hexamethylene glycol or their mixtures. Preferably used as component (b) are polyoxypropylene glycols.

The polyol mixtures to be used in accordance with this invention are produced by mixing 1 part to 60 parts by weight, preferably 20 parts to 50 parts by weight, of at least one tri- to octafunctional polyether polyol (a) with 40 parts to 99 parts by weight, preferably 50 parts to 80 parts by weight, of at least one difunctional polyether polyol (b).

Depending upon the materials to be stabilized, it may be advantageous to incorporate so-called flexibilizers, component (c), in a quantity of 0 part to 100 parts by weight per 100 parts by weight of the polyol mixture of components (a) and (b) in order to increase the flexibility of the resultant polyurethanes. Flexibilizers are not commonly used. However, if their incorporation proves advantageous, quantities of 20 parts to 60 parts by weight of flexibilizer per 100 parts by weight of polyol mixture of components (a) and (b) have proven to work particularly well so that these amounts are used on a preferred basis.

Suitable flexibilizers are organic compounds with hydroxyl numbers of 50 to 200, preferably 105 to 160, which are liquid under the processing conditions or are at least homogeneously miscible with components (a) and (b) and are basically difunctional. Proven to work well as flexibilizers and, therefore, preferably used, are (1) difunctional polyoxyalkylene glycols such as polyoxyethylene glycols, polyoxypropylene glycols, and polyoxyethylene-polyoxypropylene glycols which contain the polyoxyethylene and polyoxypropylene units in statistical distribution or as polymer blocks, for instance, in the segment sequence polyoxyethylene-polyoxypropylene-polyoxyethylene or polyoxypropylene-polyoxyethylene-polyoxypropylene in bonded form; (2) difunctional polyester polyols, prepared by reacting an aliphatic dicarboxylic acid with 4 to 12, preferably 4 to 6, carbon atoms such as succinic, glutaric, and adipic acids with a diol with 2 to 12, preferably 2 to 6, carbon atoms such as ethylene glycol, diethylene glycol, propylene glycol, dipropylene glycol, 1,4-butane diol, 1,5-pentamethylene glycol and 1,6-hexamethylene glycol as well as their mixtures; (3) ethoxylated and/or propoxylated castor oil, castor oil, ethoxylated and/or propoxylated tallow oil, and (4) tallow oil. The mentioned flexibilizers may be used individually or in the form of mixtures. Particularly preferred are difunctional polyoxyalkylene glycols, difunctional polyester polyols, tallow oil, and castor oil.

Typical organic polyisocyanates which can be used for the subject invention include, for instance, aromatic polyisocyanates such as 2,4- and 2,6-toluene-diisocyanate as well as their commercially available isomer mixtures; 2,2'-, 2,4'- and 4,4'-diphenylmethane diisocyanate as well as their isomer mixtures, particularly those of 2,4'- and 4,4'-diphenylmethane diisocyanate; and mixtures of the isomeric diphenylmethane diisocyanate and polyphenyl polymethylene polyisocyanates (crude MDI). Instead of the pure polyisocyanates or polyisocyanate mixtures, modified aromatic polyisocyanates such as carbodiimide-, urethane- and/or isocyanurate group containing polyisocyanates based on the above-mentioned aromatic polyisocyanates may also be used. Preferably used are the commercially available optionally modified diphenyl methane diisocyanates, crude MDI, and their mixtures.

The quantity ratio in which the polyol mixture and the organic polyisocyanates are brought to reaction can be varied within wide ranges, for instance, in a ratio of hydroxyl to isocyanate groups of 1:0.5 to 2.

If the formation to be stabilized contains a high degree of moisture, it is advantageous to use a greater excess of polyisocyanate. Preferably used is a ratio of hydroxyl to isocyanate groups of 1:0.9 to 1.1.

The preferred blowing agent used in the process according to this invention is water which reacts with the organic polyisocyanate by forming carbon dioxide. The water quantities which are normally used vary between 0.01 to 3 percent by weight, preferably 0.1 to 2 percent by weight, based on the weight of the polyol mixture.

Other blowing agents include, for instance, low boiling liquids which evaporate under the influence of the exothermal polyaddition reaction and also reduce the viscosity of the reaction mixture. Suitable agents include liquids which are inert with respect to the organic polyisocyanate and have boiling points under atmospheric pressure of preferably $-40°$ C. to $+50°$ C. Examples of such preferably used liquids include halogenated hydrocarbons such as methylene chloride, trichlorofluoromethane, dichlorodifluoromethane and dichloromonofluoromethane. The most appropriate amount of low boiling liquid is a function of the foam density which is to be achieved as well as of the amount of water used. Generally, amounts of 0.1 to 20 percent by weight based on the weight of the polyol mixture provides satisfactory results.

In order to accelerate the reaction between the polyol mixture, water and the organic polyolisocyanates, commonly used catalysts such as tertiary amines, for instance, dimethylbenzyl amine, dicyclohexylmethyl amine, dimethylcyclohexyl amine, N-methyl and/or N-ethyl morpholine, dimethylpiperazine, pyridine, 1-aza-bicyclo-(3,3,0)-octane, dimethylaminoethanol, 1,2-dimethylimidazol and, preferably, triethylenediamine; and metal salts such as iron-II-chloride, zinc chloride and, preferably, tin-II-salt and dibutyl tin dilaurate may be added to the reaction mixture. In order to achieve reaction times which are favorable from a foaming technology perspective, the amount of catalyst or catalyst mixture to be used is determined empircally as a function of its activity. Generally the polyurethane systems are sufficiently reactive so that the use of catalysts can be largely eliminated. For fast curing systems of the polyisocyanate-polyol mixtures, which are preferably used, 0.01 to 3 percent by weight of a tertiary amine and 0.01 to 2 percent by weight of a metal salt, the weight being based on the weight of the polyol mixture (a) and (b), are used. A catalyst mixture of 0.1 part to 1.0 parts by weight of triethylene diamine and 0.01 part to 0.5 parts by weight of dibutyl tin dilaurate per 100 parts by weight of the polyol mixture (a) and (b) has proven to work particularly well.

It is also possible to use other additives such as surface active substances which support the homogenization of the raw materials and which may also be suited to regulate the cell structure of the foams. These include, for instance, siloxane-oxalkylene mixed polymers and other organopolysiloxanes which are used in quantities of 0.01 to 3 percent by weight relative to the weight of the polyol mixture.

Other auxiliaries and additives may also be used. Examples include flame retardants, dyestuffs, pigments and fillers.

In order to bond rock and coal formations to themselves or to other geological formations, the polyol mixture, blowing agent, catalyst and optionally other auxiliaries and additives are mixed intensively with the organic polyisocyanates at temperatures of approximately 10° C. to 80° C. If a mixing chamber with several feed nozzles is used, the liquid raw materials may be introduced individually and may be intensively mixed in the mixing chamber. Normally, however, the two-component process is employed and the polyol mixture, blowing agent, catalyst and, optionally, auxiliaries and additives are combined to form component A and the organic polyisocyanate is used as component B.

By using the polyol mixture according to this invention, component A has a relatively low viscosity. Preferably used are A-components with viscosities of 70 mPas to 550 mPas, particularly 90 mPas to 430 mPas.

Using known methods, the resultant reactive polyisocyanate-polyol mixtures are poured into prepared drill holes, crevices and cracks in the materials to be stabilized or are pressed into these openings with pressures of up to 100 bars.

The parts referred to in the Examples are parts by weight. The following ingredients are used in the examples.

Polyol 1: A polyether polyol mixture with an OH number of 360 and a viscosity at 25° C. of 520 mPas, consisting of
 (a) 50 parts by weight of a polyether polyol based on sorbitol/glycerine and propylene oxide with an OH number of 475 and a viscosity at 25° C. of approximately 8200 mPas and
 (b) 50 parts by weight of a polyether polyol based on dipropylene glycol and propylene oxide with an OH number of 250 and a viscosity at 25° C. of 70 mPas.

Polyol 2: A polyether polyol based on propylene glycol and propylene oxide with an OH number of 250 and a viscosity at 25° C. of 70 mPas.

Polyol 3: A polyether polyol based on propylene glycol and propylene oxide with an OH number of 205 and a viscosity at 25° C. of 150 mPas.

Polyol 4: A polyether polyol based on 1,2-propylene glycol and propylene oxide with an OH number of 56 and a viscosity at 25° C. of 320 mPas.

Polyol 5: Castor oil with an OH number of 160.

Polyol Mixture I: a polyol consisting of 85 parts by weight of Polyol 1, and 14 parts by weight of Polyol 2. Viscosity at 25° C.:360 mPas Polyol Mixture II: a polyol consisting of 85 parts by weight of Polyol 1, and 15 parts by weight of Polyol 3. Viscosity at 25° C.:380 mPas Polyol Mixture III: a polyol consisting of 85 parts by weight of Polyol 1, and 15 parts by weight of Polyol 4. Viscosity at 25° C.:480 mPas Polyol Mixture IV: a polyol consisting of 85 parts by weight of Polyol 1, and 15 parts by weight of Polyol 5. Viscosity at 25°°C.:520 mPas.

Polyol mixtures I through IV basically have the same reactivity.

EXAMPLES 1-4

In a reaction vessel, 100 parts by weight of the polyol mixtures listed in Table I were intensively mixed with 115 parts by weight of a commercially available mixture of diphenylmethane diisocyanates and polyphenyl polymethylene polyisocyanates (crude MDI) at 24° C.

The viscosity of the reaction mixture was measured at 24° C. with a Ford beaker having a nozzle of 4 mm diameter. That point in time was determined at which the outflowing liquid thread of the reaction mixture tears off.

The infiltration capacity was determined as follows: 50 grams of a shale with a grain size of 0.1 mm to 2 mm were placed in a polyethylene foil bag which is 10 cm high and 6.5 cm wide and which has 6 vent holes with diameter of 0.6 mm at the bottom. Ten grams of the reaction mixture were placed on the shale. After 60 minutes, the nonadhering shale was separated, weighed and the amount of adhered shale was calculated by determining the difference.

Table I contains a comparison of the viscosities determined by way of a Ford beaker for the reaction mixture and according to DIN 53 015 for the polyol mixture. Table also contains the determined values for the infiltration capacity.

TABLE I

| Polyol Example | Mixture | DIN (mPas) | Viscosity Ford Beaker (sec.) | Infiltration Capacity Shale Gravel Bonded (grams) |
|---|---|---|---|---|
| 1 | I | 360 | 72 | 30 |
| 2 | II | 380 | 83 | 29 |
| 3 | III | 480 | 94 | 24 |
| 4 | IV | 520 | 93 | 25 |

The bondability of shale and bituminous coal were determined as follows:

Prisms of shale and coal having dimensions of 40 × 40 × 160 mm in accordance with DIN 1164 were broken into two sample halves which were as equal as possible and/or were cut into two sample halves of equal size using a dry diamond saw. The constant gap between the sample halves having a width of 2 mm was filled with a reaction mixture.

After curing for approximately one day at room temperature, the bonded prism halves were tempered for 5 hours at 80° C. Following this, the bending strength was tested in accordance with DIN 1164. The resultant values were considered as a measure for the bondability and are compiled in Table II.

TABLE II

| | Bondability | | | |
| | Shale | | Gas Coal | |
| | Cut | Broken surface | Cut | Broken surface |
| Polyol Mixture | N/mm² | N/mm² | N/mm² | N/mm² |
| I | 2.9 | 3.7 | 8.1 | 2.0* |
| II | 3.0 | 3.3 | 1.4* | — |
| III | 2.8 | 6.3 | 3.2* | — |

*coal breaks

The bending strength according to DIN 1164 of the gas coal was 2.0 N/mm2, that of hard shale 31.0 (parallel with the deposit stratum) and 9.9 N/mm2 (perpendicular to the deposit stratum).

The compression strength according to DIN 1164 of shale was 123.0 and/or 59.1 N/mm2.

EXAMPLES 5-7

In a reaction vessel, 100 parts by weight of the polyol mixtures referenced in Table III were intensively mixed with 115 parts by weight of a commercial crude MDI in the presence of 0.2 parts by weight of triethylene diamine (33 percent solution in diethylene glycol) and 0.03 parts by weight of dibutyl tin dilaurate.

Two kilograms of the above-referenced reaction mixture were placed in a 19 cm wide polyethylene foil bag and were brought in contact with 3.2 kg shale with grain sizes in the range from 2 mm to 10 mm. After a gel time of approximately 100 seconds, test bodies were prepared and were used to determine the bending strength in accordance with DIN 1164 (the test bodies were prisms having dimensions of 40 × 40 × 160 mm), the compression strength according to DIN 53 421 (test bodies 40 × 40 × 40 mm; test rate 5 mm per minute) and a bulk density according to DIN 53 420. The test bodies consisted of 60 percent by weight of shale and 40 percent by weight of polyurethane.

The measuring results are compiled in Table III.

TABLE III

| Example | Polyol Mixture | Bending Strength $N/mm^2$ | Compression Strength at 30% compression* $N/mm^2$ | Bulk Density $kb/m^3$ |
|---|---|---|---|---|
| 5 | I | 5.3 | 10.5 (no break) | 870 |
| 6 | II | 5.6 | 15.7 (beginning of break) | 1040 |
| 7 | III | 5.7 | 13.5 (beginning of break) | 980 |

*a visible damage occurs in agglomerate.

EXAMPLES 8–11

In a reaction vessel, 100 parts by weight of the polyol mixtures mentioned in Table IV were intensively mixed with 115 parts by weight of crude MDI and 0.25 parts by weight of water in the presence of 0.25 parts by weight of dibutyl tin dilaurate.

Two kilograms of the resultant reaction are filled into a polyethylene foil bag (60 cm × 19 cm) and are allowed to foam.

The block density (DIN 53 420), tensile strength and breaking elongation (DIN 53 430, test rate 20 mm/minute), bending strength and deflection (DIN 53 423) and the compression stress and compression (DIN 53 421, test rate 5 mm/minute) were measured on these test samples.

The resultant measured values are compiled in Table IV.

TABLE IV

| | | Properties of the polyurethane foams in a density range of 350 to 400 $kg/m^3$ | | | | | | Compression Stress and Compression | | |
|---|---|---|---|---|---|---|---|---|---|---|
| Example | Polyol Mixture | Tensile Strength* $(N/mm^2)$ | Breaking Elongation (%) | Bulk Density $(kg/m^3)$ | Bending Strength $(N/mm^2)$ | Deflection (mm) | Bulk Density $(kg/m^3)$ | 10% $(N/mm^2)$ | 60% $(N/mm^2)$ | Bulk Density $(kg/m^3)$ |
| 8 | I | 7.1 | 4.8 | 380 | 8.8 | 5.6 | 340 | 5.9 | 17.0 | 340 |
| 9 | II | 7.1 | 4.2 | 390 | 11.8 | 5.8 | 390 | 7.7 | 18.6 | 380 |
| 10 | III | 6.8 | 4.8 | 380 | 9.5 | 6.2 | 350 | 6.1 | 16.0 | 350 |
| 11 | IV | 6.3 | 4.9 | 350 | — | — | — | — | — | — |

*Test bodies in accordance with DIN 53 571, $L_O = 50$ mm

The embodiments of the invention in which an exclusive privilege or property is claimed are defined as follows:

1. In a process for stabilizing rock and coal formations by bonding them to themselves or other geological formations by means of a reactive organic polyisocyanate-polyol mixture, wherein the improvement comprises selecting as the polyol component, a mixture comprising:

(a) from 1 part to 60 parts by weight of at least one tri- to octafunctional polyether polyol having a hydroxyl number of 390 to 580;
   (b) from 40 parts to 99 parts by weight of at least one difunctional polyether polyol having a hydroxyl number of 200 to 300; and
   (c) from 0 part to 100 parts by weight per 100 parts by weight of components (a) and (b) of a flexibilizing agent having a hydroxyl number of 50 to 200.

2. The process of claim 1 wherein the flexibilizer is selected from the group consisting of difunctional polyoxyalkylene glycols, difunctional polyester polyols, castor oil, tall oil, and mixtures thereof.

3. The process of claim 1 wherein the difunctional polyether polyol is selected from the group consisting of polyoxyethylene glycols, polyoxypropylene glycols, and polyoxyethylene-polyoxypropylene glycols which contain the polyoxyethylene and polyoxypropylene units in statistical distribution or as polymer blocks in bonded form.

4. The process of claim 1 wherein mixtures are used as polyols comprising (a) from 20 parts to 50 parts by weight of at least one tri- to octafunctional polyether polyol having a hydroxyl number of 390 to 570;
   (b) from 50 parts to 80 parts by weight of at least one difunctional polyether polyol having a hydroxyl number of 200 to 300; and
   (c) from 20 parts to 60 parts by weight per 100 parts by weight of components (a) and (b) of a flexibilizer having a hydroxyl number of 50 to 200 selected from the group consisting of difunctional polyoxyalkylene glycols, difunctional polyester polyols, castor oil, tall oil, and mixtures thereof.

5. The process of claim 1 wherein a mixture of 0.1 part to 1.0 part by weight of triethylene diamine and 0.01 part to 0.5 part by weight of dibutyltin dilaurate per 100 parts by weight of components (a) and (b) are used as catalysts.

6. The process of claim 1 wherein the ratio of hydroxy groups of the polyol mixture to isocyanate groups of the organic polyisocyanate is from 1:0.9 to 1:1.

7. In a process for stabilizing rock formations and coal formations by bonding them to themselves or other geological formations by means of a reactive organic polyisocyanate-polyol mixture, wherein the improvement comprises selecting as the polyol component, a mixture comprising:

(a) from 20 parts to 50 parts by weight of at least one tri- to octafunctional polyether polyol having a hydroxyl number of 390 to 570; and
   (b) from 50 to 80 parts by weight of at least one difunctional polyether polyol having a hydroxyl number of 200 to 300.

* * * * *